United States Patent [19]
Brown

[11] Patent Number: 5,456,829
[45] Date of Patent: Oct. 10, 1995

[54] METHOD AND APPARATUS FOR RECYCLING WASTEWATER

[75] Inventor: Keith O. Brown, Arvada, Colo.

[73] Assignees: Fishman; William; Waldbaum; Philip, both of Denver, Colo.

[21] Appl. No.: 30,602

[22] Filed: Mar. 11, 1993

[51] Int. Cl.$^6$ .............................. C02F 1/52; B01D 21/01; B01D 21/24
[52] U.S. Cl. .......................... 210/194; 210/206; 210/208; 210/219; 210/221.2
[58] Field of Search .................................. 210/194, 205, 210/206, 207, 208, 219, 220, 221.1, 221.2, 534, 537, 95

[56] References Cited

U.S. PATENT DOCUMENTS

| | | | |
|---|---|---|---|
| 2,984,360 | 5/1961 | Smith | 210/537 |
| 3,351,551 | 11/1967 | Sines | 210/206 |
| 3,425,802 | 2/1969 | Booth | 210/733 |
| 3,558,052 | 1/1971 | Dunn . | |
| 3,779,910 | 12/1973 | Chatfield | 210/195 |
| 3,869,408 | 3/1975 | Herce et al. | 252/360 |
| 3,948,770 | 4/1976 | Goodrich et al. . | |
| 4,081,373 | 3/1978 | Rozniecki | 210/114 |
| 4,242,209 | 12/1980 | Geurtsen | 210/537 |
| 4,361,488 | 11/1982 | White et al. | 210/776 |
| 4,457,842 | 7/1984 | Bereiter | 210/198.1 |
| 4,466,154 | 8/1984 | Urbani | 210/537 |
| 4,492,636 | 1/1985 | Burke | 210/706 |
| 4,610,785 | 9/1986 | Russell | 210/195.1 |
| 4,872,975 | 10/1989 | Benson | 210/99 |
| 4,950,392 | 8/1990 | Tiegs et al. | 210/167 |
| 5,047,157 | 9/1991 | Hoffman et al. | 210/787 |
| 5,069,784 | 12/1991 | Taniguchi et al. | 210/219 |
| 5,071,567 | 12/1991 | Corcelle et al. | 210/744 |

OTHER PUBLICATIONS american Colloid Company brochure 6 pgs.
AC-55 Small Batch Wastewater Treatment System–admitted prior art Jet Washing Better Engineering brochure–admitted prior art.

*Primary Examiner*—Neil McCarthy

[57] ABSTRACT

An apparatus for recycling wastewater solutions includes a treatment tank and an air-operated pump and piping system for pumping wastewater contaminated with oil, heavy metals, and suspended solids from industrial equipment such as a jetwasher to the treatment tank, and for subsequently returning the purified water solution to the industrial equipment for reuse. A weir tube initially skims oil contaminants from the surface of wastewater in the treatment tank into a collection vessel. The recycling apparatus is powered solely by compressed air, which drives a rotary air motor powering mixing vanes in the treatment tank. Exhaust air from the mixing motor outlets into the treatment tank for the purpose of creating turbulence to enhance mixing. Air directed through an induction nozzle entrains flocculating polymer powder from a hopper in an air stream within a polymer supply hose exhausting into the treatment tank. After contaminant flocculation and settling, a decant outlet and a sludge outlet on the treatment tank decant purified water solution, and drain a contaminant sludge, respectively, into a strainer basket disposed at the top of a recovery barrel. Selective manipulation of fluid control valves allows pumping of the purified water solution from the recovery barrel back to the industrial equipment for reuse. The sludge byproduct collected and dried in the filter basket meets typical regulatory requirements for landfill disposal.

47 Claims, 4 Drawing Sheets

METHOD AND APPARATUS FOR RECYCLING WASTEWATER

BACKGROUND OF THE INVENTION

1. Field Of The Invention

The present invention relates to wastewater treatment methods and systems, and more particularly pertains to the removal of emulsified oil, heavy metals, and other contaminants from water and water based solutions. Such water based solutions find applications for metal parts cleaning in the metal working industry, cutting and grinding oils, die casting, metal plating, pressure washers, and steam cleaning. Another example application is in the field of painting, and particularly in spray booth applications. A further application is in the field of removing printer's ink from water based cleaning solutions resulting from the cleaning of printing equipment.

2. Description Of The Prior Art

Many techniques are available to help remove contaminants from wastewater, reduce or eliminate the hazardous nature of the effluent and prepare the water for release into the environment. Most conventional techniques are multi-step and require time as well as extensive handling to accomplish the task of removing suspended solids, oils, and metal ions from the water. Even if the problems of time and handling are alleviated, a significant problem remains because most available methods leave residues still classified as a hazardous waste. The currently accepted best available treatment for most of these residues is to stabilize them in a matrix that will not allow any leaching of the hazardous materials into the surrounding environment. This is, of course, an extra manipulation that requires time and adds even more cost to the operations of already overburdened treatment facilities.

Waste waters contain a mixture of suspended or colloidal solids, dissolved metals and ions, and organic contaminants. The art of waste water cleanup is predicated on the concept of precipitating these species out of solution into an aggregated mass that either floats on the surface where it can be skimmed off, or sinks to the bottom where it can be removed by filtration or decantation. The process of forming that solid is called flocculation, and the solid that forms is called a floc (actually short for floccule, although the term is no longer used). The mechanism of flocculation is rather complex, but it involves the presence of extremely tiny colloidal particles and dissolved ions. All particles exert forces, both attractive and repulsive, on each other. For colloidal particles, the attractive forces are much weaker than the repulsive forces; that fact, coupled with their extremely small size, allows them to remain suspended in solution. However, under the right conditions, the attractive forces can be strengthened and the repulsive forces shielded so that flocculation occurs.

The traditional approach to purifying wastewater containing particulates, oils, and dissolved metals involves flocculating these contaminants by successively adjusting the wastewater conditions to the point where each particular class of contaminant will become insoluble and agglomerate into a small mass that can be removed from the much larger volume of purified water. The first step usually consists of adjusting the water to acidic conditions to break any oil emulsions that may exist. Most of the oil will float to the top of the treatment tank where it can be removed by skimming. A cationic polymer (called a flocculent) is typically added at this point to attract negatively charged species in the water as well as any remaining oil. When the polymer performs properly, it flocculates into a mass that can be removed from the water by decantation and filtration. The water must be tested to be sure that enough oil has been removed to achieve appropriate standards. If it does not pass this test, the treatment is repeated until it does. This process is often time consuming because a certain amount of trial and error is frequently required to find the right polymer for generating a floc that is dense enough to separate the oil. Often the polymer/oil interaction is not particularly strong. Since oil and water don't mix whereas like materials readily solubilize each other, the oil tends to associate with the polymer chains because they are more similar to the oil than the water. However, since the polymer itself is polar enough to be soluble in water, it becomes only slightly more desirable as a partner for the oil than the water. If enough water washes through the polymer/oil floc, the two will separate. Such a floc is unlikely to pass the leachability tests for hazardous materials.

Additionally, prior art wastewater systems involve large treatment tanks and are suitable only for treating large and continuously supplied wastewater streams. Many industries generating relatively small quantities of wastewater must currently pay large fees for trucking to a treatment facility. The EPA and various state and local government agencies are adopting increasingly stringent standards for wastewater disposal. Environmental law now provides stiff economic penalties and cleanup cost liability on land owners where hazardous materials have been dumped. Accordingly, there is a need for and considerable interest in a wastewater treatment method and apparatus capable of economically treating wastewater on a relatively small batch basis which results in a landfill acceptable sludge. Further, many industrial water based solutions contain valuable chemical components which would result in a great savings if recovered and recycled during wastewater treatment.

SUMMARY OF THE INVENTION

The present invention provides a method and apparatus for treating wastewater, and more particularly for removing emulsified oils, heavy metals, and other contaminants from wastewater on a batch processing basis. One example application of the inventive method and apparatus is in connection with the removal of oils, greases, and suspended solids from alkaline-based water washing solutions used in jet-washers, soak tanks, or other industrial cleaning equipment. The method of the present invention removes contaminants in a simple, quick, efficient, inexpensive and single-step treatment operation that clarifies the contaminated water based cleaning solution and yields a non-leachable, non-hazardous solid as the only by-product.

The inventive apparatus includes a treatment tank and an air-operated pump and piping system for pumping wastewater contaminated with oil, heavy metals, and suspended solids from industrial equipment such as a jetwasher to the treatment tank, and for subsequently returning the purified water solution to the industrial equipment for reuse. A weir tube initially skims oil contaminants from the surface of wastewater in the treatment tank into a collection vessel. The recycling apparatus is powered solely by compressed air, which drives a rotary air motor powering mixing vanes in the treatment tank. Exhaust air from the mixing motor outlets into the treatment tank for the purpose of creating turbulence to enhance mixing. Air directed through an induction nozzle entrains flocculating polymer powder from a hopper in an air stream within a polymer supply hose exhausting into the treatment tank. After contaminant flocculation and settling, a decant outlet and a sludge outlet on the treatment tank decant purified water solution, and drain a contaminant sludge, respectively, into a strainer basket disposed at the top of a recovery barrel. Selective manipulation of fluid control valves allows pumping of the purified water solution from the recovery barrel back to the industrial equipment for reuse. The sludge byproduct collected and dried in the filter basket meets typical regulatory requirements for landfill disposal.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT(S)

Figure 1:
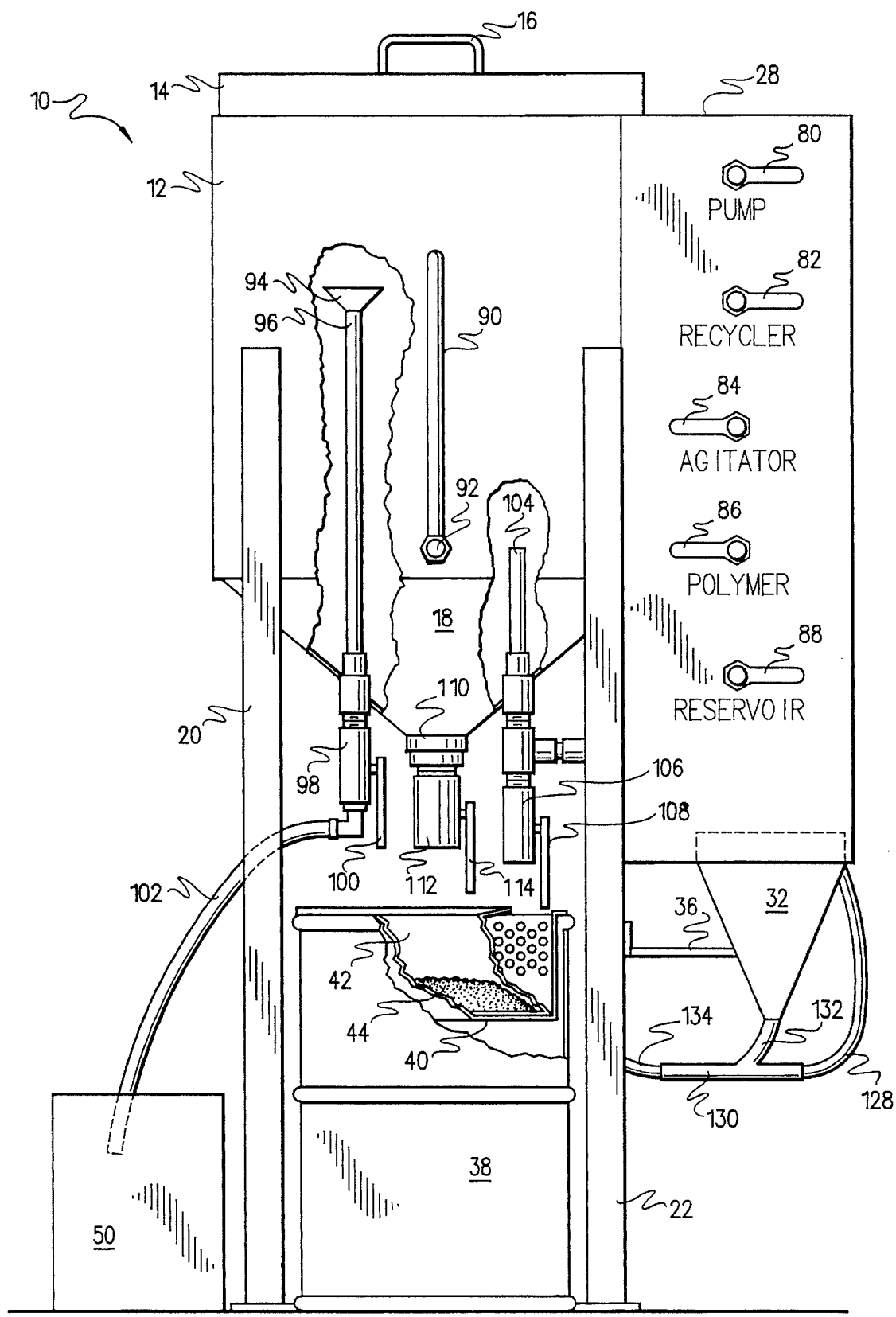
FIG. 1 is a front elevational view, partially cutaway, illustrating the apparatus for recycling wastewater according to the present invention.
Figure 2:
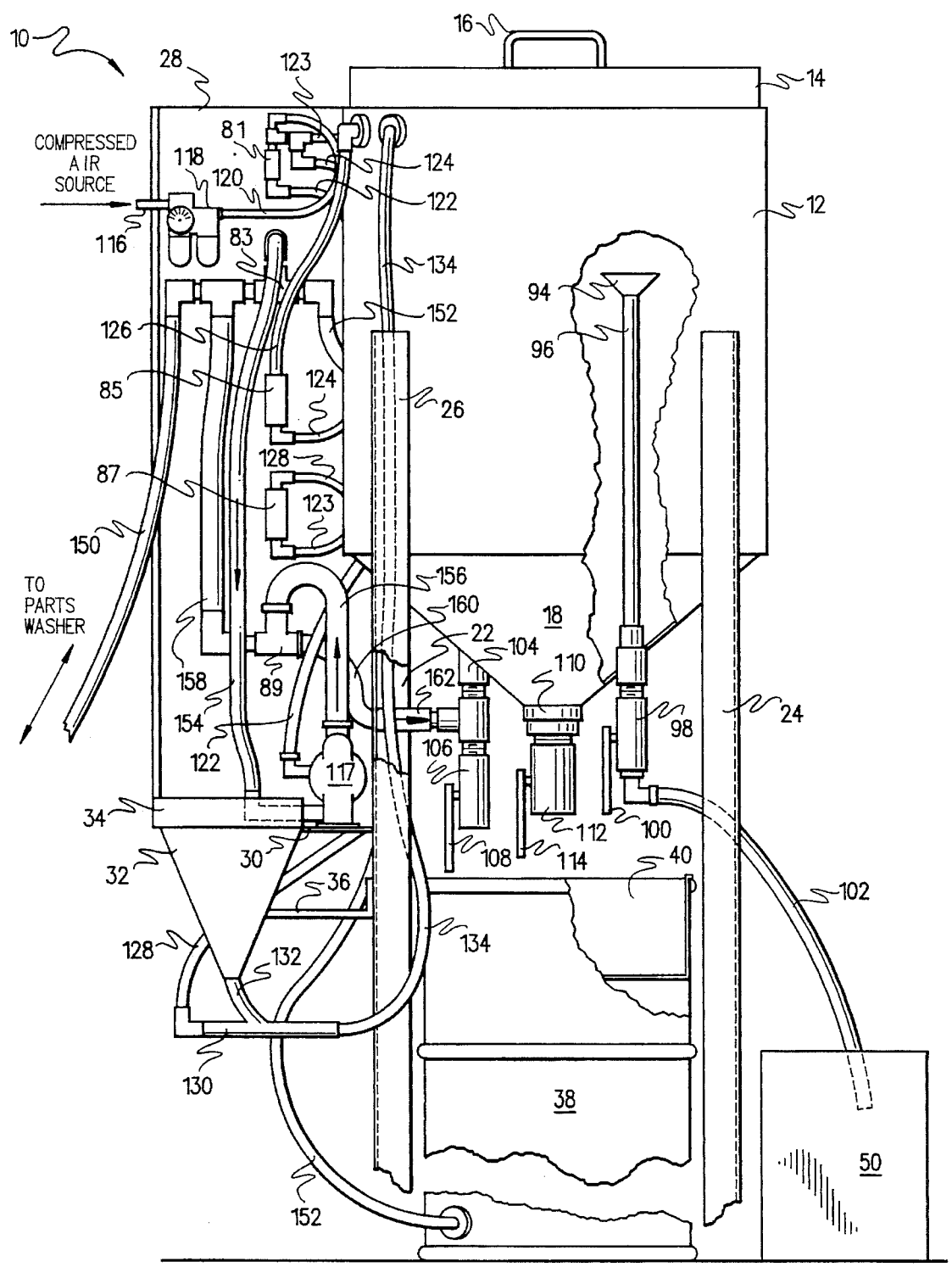
FIG. 2 is a rear elevational view, partially cut-away, illustrating the wastewater recycling apparatus of the present invention.
Figure 3:
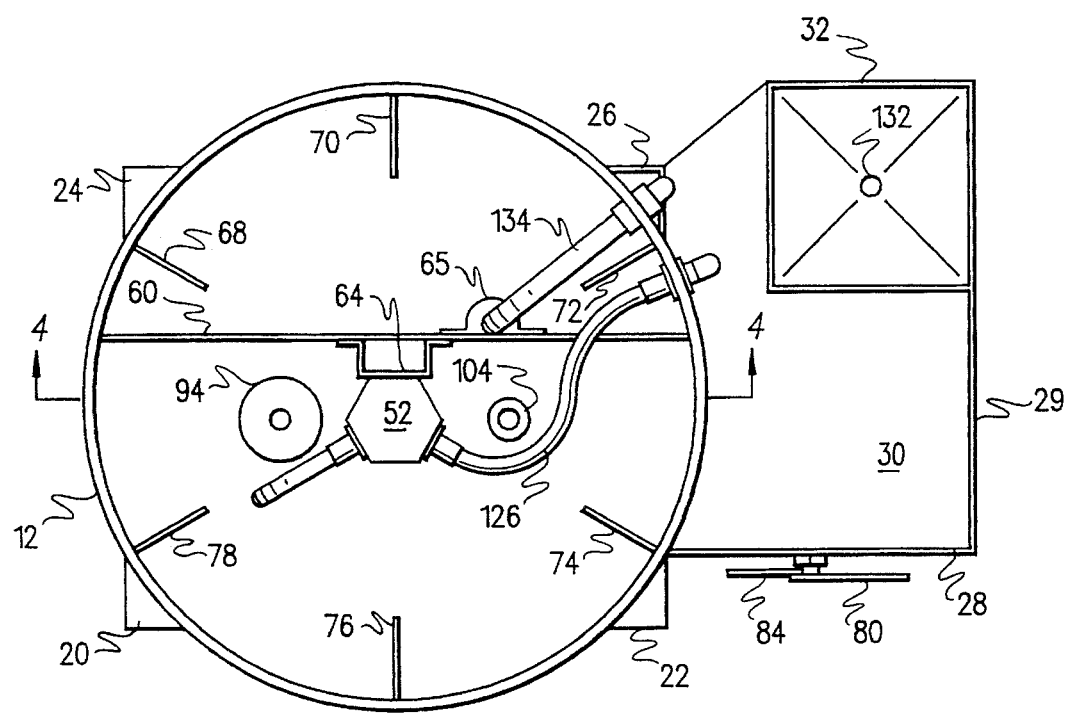
FIG. 3 is a top plan view illustrating the wastewater recycling apparatus of the present invention, with the treatment tank cover removed.

Referring now to the drawings, wherein like reference numerals designate corresponding structure throughout the views, and referring in particular to FIGS. 1 through 4, an improved apparatus for wastewater recycling 10 according to a first preferred embodiment of the invention includes a substantially cylindrical metal treatment tank 12 possessing a circular top opening provided with a cover 14. An upstanding handle 16 facilitates removal and replacement of the cover 14. The tank 12 terminates at a bottom end in a downwardly and inwardly converging frustoconical portion referred to hereinafter as cone 18. Four vertical support legs 20, 22, 24, and 26 spaced at substantially equal ninety degree circumferential increments are welded or otherwise secured to an outer surface of the tank 12. A sheet metal control panel 28 extending laterally from support leg 22 includes a right angular rearwardly extending side wall portion 29. A horizontal mounting plate 30 extends between support legs 22 and 26, control panel 28, and side wall 29. A polymer dispensing hopper 32 disposed in a notched-out portion of mounting plate 30 includes a square or rectangular open top (FIG. 3, depicted with cover removed) closed by a complimentary cover 34. The cover 34 preferably includes a small air vent aperture to allow pressure equalization within hopper 32 during polymer dispensing. The hopper 32 possesses a pyramidal configuration, with four triangular sidewalls converging downwardly an inwardly to a smooth transition with a circular bottom outlet 132. A bracket 36 extending between hopper 32 and leg 26 enhances structural integrity of hopper 32.

A free standing recovery barrel 38 disposed centrally beneath cone 18 within the bounds of support legs 20, 22, 24, and 26 includes a perforated sieve-like filter basket 40 lined with replaceable filter paper 42 (FIG. 1) for the purpose of collecting and drying contaminated sludge 44 resulting from the recycling process of the present invention. An oil collection vessel 50 stands adjacent barrel 38 for the purpose of collecting contaminant oil skimmed from the surface of wastewater within treatment tank 12 in a manner described hereinafter.

Figure 4:
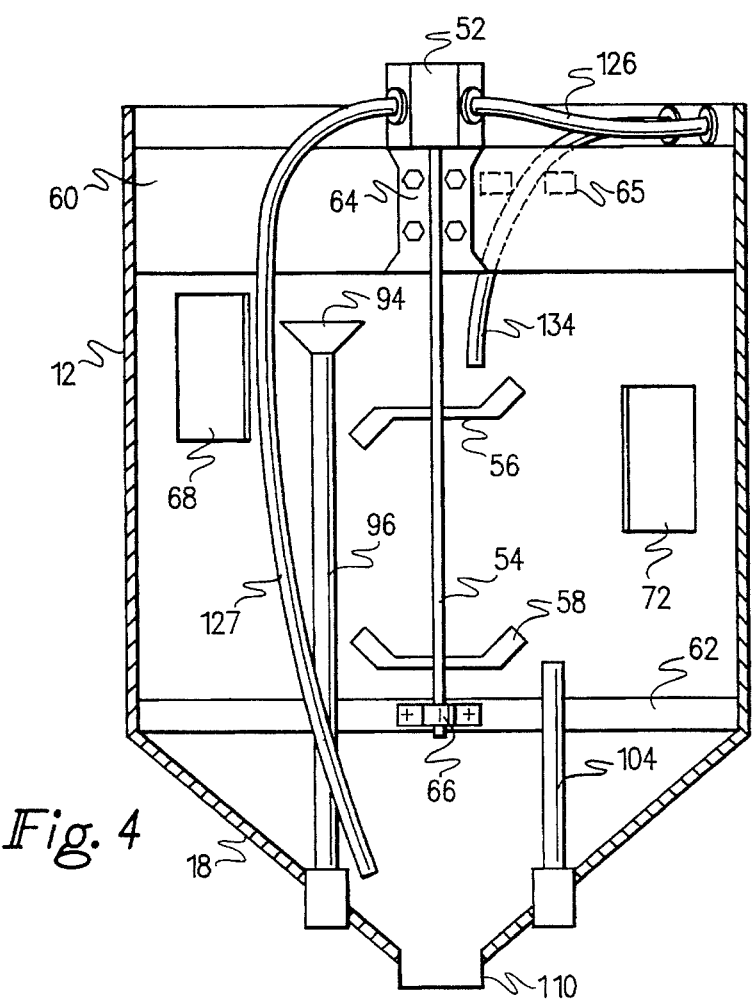
FIG. 4 is a longitudinal cross-sectional view taken along line 4—4 of FIG. 3 and illustrating the internal components of the treatment tank.

As best shown in FIG. 4, a rotary air motor 52 powers an agitator shaft 54 provided with two sets of axially spaced radially extending mixing vanes 56 and 58 for the purpose of thoroughly mixing wastewater in the treatment tank 12 with a flocculating polymer. Generally diametrically extending upper 60 and lower 62 cross braces welded or otherwise secured within tank 12 support, respectively, air motor 52 and lower shaft bearing 66. A bracket 64, in conjunction with conventional fasteners (e.g. nuts and bolts) secures air motor 52 to upper cross brace 60. A hose bracket 65 secures an outlet end portion of polymer supply hose 134 to upper cross brace 60, such that polymer powder delivered through hose 134 exhausts downwardly into the tank 12 for mixing with wastewater therein. A plurality of circumferentially spaced and vertically staggered rectangular baffles 68, 70, 72, 74, 76, and 78 (FIGS. 3 and 4) extend radially inwardly from interior sidewall portions of the tank 12 to enhance turbulence and facilitate mixing. The illustrated embodiment employs six baffles disposes at equal sixty degree circumferential increments, although a different number and/or differently spaced baffles are contemplated within the scope of the invention.

Six valve control handles 80, 82, 84, 86, and 88 disposed in a vertically extending column on control panel 28 control operation of the recycling apparatus 10 in a manner described subsequently. A sight glass tube 90 includes upper and lower ends in fluid communication with treatment tank 12 for the purpose of monitoring tank volume level, oil separation, and flocculation process status. A valve 92 at the bottom end of sight glass tube 90 allows the tube to be selectively closed or drained.

A tube 96 extending axially upwardly through cone 18 terminates in an upwardly and radially outwardly flaring frustoconical weir 94 for the purpose of skimming separated oil from the surface of wastewater within tank 12. A valve 98 actuated manually via handle 100 selectively drains oil through drain hose 102 into collection vessel 50 for subsequent disposal or recycling.

A purified water solution decant tube 104 extends vertically upwardly through cone 18 to a level slightly above the junction of cone 18 with the bottom of the cylindrical portion of tank 12. Manual operation of valve 106 by manipulation of handle 108 allows purified water solution to be decanted from tank 12 at a level above contaminated sludge settled in cone 18. Contaminated sludge and remaining fluid subsequently exit cone 18 through sludge outlet 110 communicating with a valve 110 actuated by a handle 114. Decant tube valve 106 and sludge valve 112 both exhaust by virtue of gravity into a filter paper 42 lining filter basket 40. Decantation of purified solution prior to sludge exhaust prevents premature clogging of the filter paper 42 and thus speeds the process.

Figure 5:
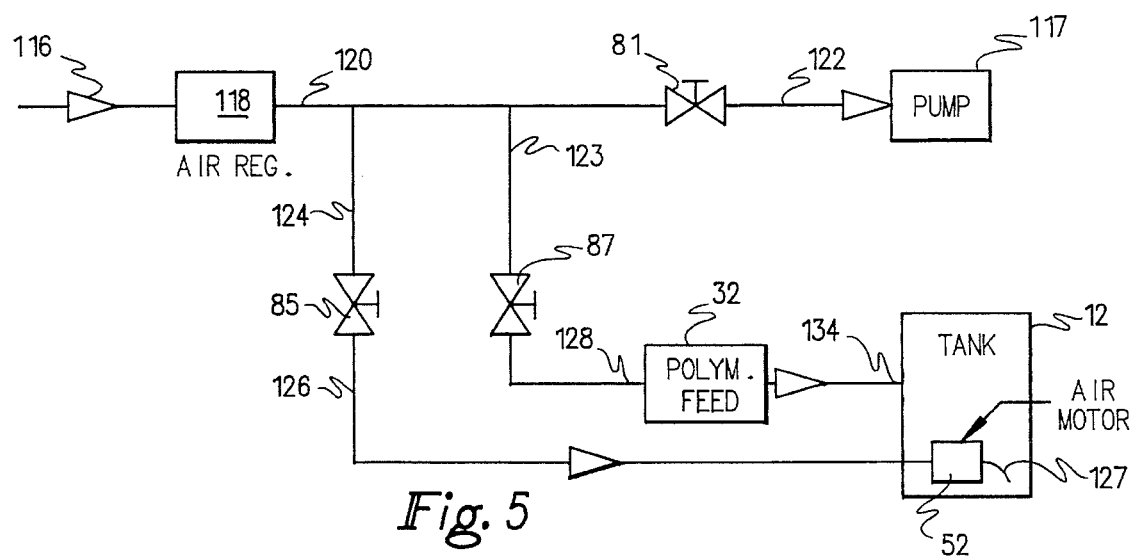
FIG. 5 is a schematic diagram illustrating the air control system of the wastewater recycling apparatus of the present invention.
Figure 6:
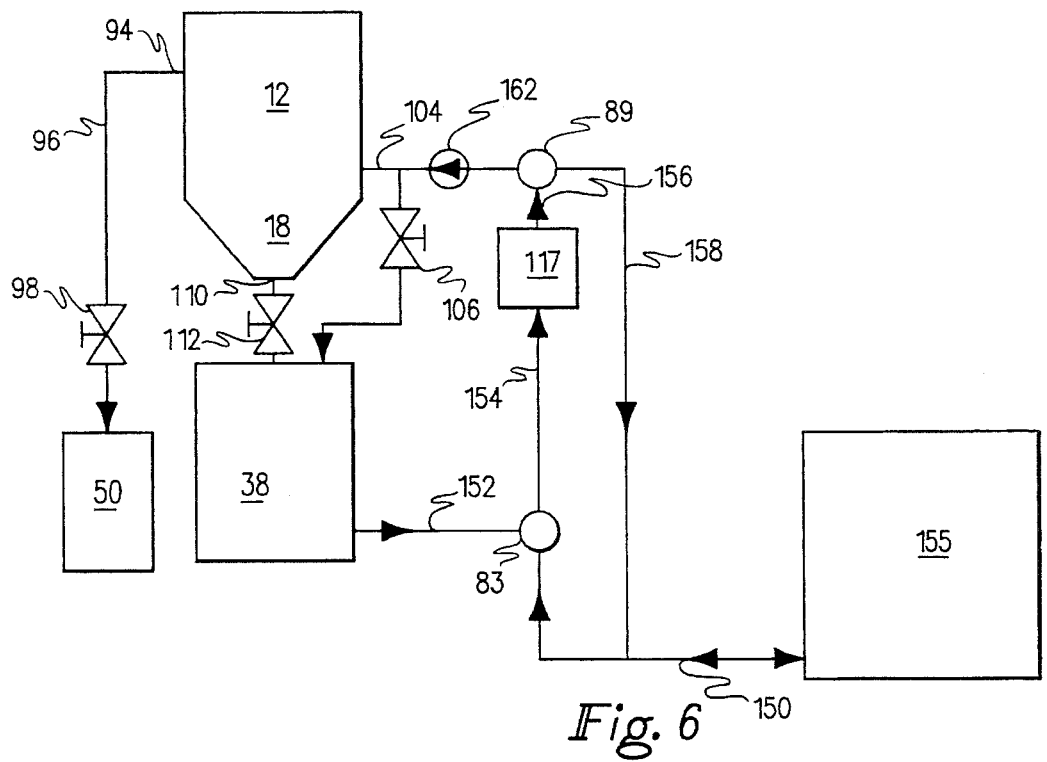
FIG. 6 is a schematic diagram illustrating the wastewater flow path of the wastewater recycling apparatus of the present invention.

With reference now to FIG. 2 and with particular attention to the schematic air circuit diagram shown in FIG. 5, the recycling apparatus 10 is powered solely by a compressed air source 116, thus eliminating the need for electrical power and obviating the associated hazards. A conventional regulator 118 provides a regulated air pressure, and also includes a gage and drying element.

The regulated air output from regulator 188 is connected to three separate feed lines. Feed line 124 is connected to the air input of mixing air motor 52 when valve 85 is manually opened by manipulating "AGITATOR" control handle 84 (FIG. 1). The air outlet line 127 from motor 52 extends to adjacent the bottom of cone 18 such that the exhaust air facilitates mixing and turbulence within the tank 12 when the mixing motor 52 is operating.

Feed line 123 is connected to an input line 128 of an induction nozzle 130 (FIG. 2) when valve 87 is manually opened via "POLYMER" control handle 86 (FIG. 1). The induction nozzle 130 comprises a Y fitting having one leg connected to the circular bottom outlet 132 of the polymer dispensing hopper 32. Preferably, the outlet 132 of the hopper 32 is detachably connected to the nozzle 130 by a suitable conventional fitting. Thus, as compressed air travels at a high velocity through nozzle 130, a low pressure is induced in polymer outlet 132, resulting in the entrainment of the polymer powder in the outlet line 134 from nozzle 130, which exhausts into the tank 12, thus dispersing the polymer into the wastewater in the tank 12.

Air feed line 122 communicates with the air input of an air operated diaphragm type-pump 117 via valve 81, such that when the "PUMP" handle 80 (FIG. 1) is opened, the pump 117 will pump wastewater either into tank 12 for treatment, or out of recovery barrel 38 and back to the particular industrial equipment for reuse, depending upon the position of various water control valves described below.

Referring now to FIGS. 2 and also to the wastewater fluid schematic flow diagram depicted in FIG. 5, contaminated wastewater from industrial equipment such as a jetwasher 155 is initially pumped through line 150, and two-way valve 83 into the water intake 154 of pump 117. The water outlet 156 from pump 117 is directed through two-way valve 89 and one-way valve 162 upwardly through decant outlet 104 into tank 12. Two-way valve 83 may be selectively set by manipulation of "RECYCLER" handle 82 (FIG. 1) to connect either line 150 from jetwasher 155 or drain 152 from recovery barrel 38 to the intake 154 of pump 117. Two-way valve 89 may be selectively set by manipulation of "RESERVOIR" handle 88 (FIG. 1) to connect the water outlet 156 of pump 117 to either decant tube 104 or to purified water solution return line 158. Thus, by cooperative setting of valves 83 and 89, contaminated fluid may be pumped from jetwasher 155 to tank 12 for treatment, purified, and subsequently pumped from recovery barrel 38 back to jetwasher 155 for reuse.

In the manner of using the apparatus 10 of the present invention for recycling contaminated wastewater, water is initially pumped to tank 12 from jetwasher 155 by proper setting of valves 83, 89 and operation of handle 80 to activate pump 117. After the tank 12 is filled to a desired level as indicated by sight glass 90, the pump 117 is turned off. After a settling period, separated oil which rises to the surface and is viewed through sight glass 90 is skimmed off through weir 94, tube 96, and into collection vessel 50 by opening valve 98. Complete skimming of the oil may be observed through sight glass 90. If oil remains below the level of weir 94, pump 117 may be restarted or additional tap water added by a garden hose to raise the level within tank 12 for further skimming. After all the separated surface oil layer has been skimmed off, valve 98 is closed and air motor 52 is actuated by moving handle 84 to the open position. The polymer powder is then dispensed from hopper 32 into tank 12 through supply hose 134 by moving handle 86 to the open position. Hopper 32 is dimensioned to hold a predetermined single charge volume of polymer such that the entire quantity of hopper 32 is blown into tank 12 before closing handle 86. The flocculation or precipitation process is then observed through sight glass 90. After sufficient flocculation occurs, handle 84 is closed to turn off the mixing motor to allow settling of the flocculent.

After observing settling in sight glass 90, decant valve 106 is opened to drain purified water solution into recovery barrel 38. Subsequently, sludge valve 112 is opened to deposit sludge 44 into the filter basket 40. When treatment is completed, the purified water solution may be pumped backed to the jetwasher 155 by appropriate setting of valves 83 and 89 and operation of pump 117.

The sludge in the filter basket 40 is allowed to dry, typically 24 to 48 hours, to cake form and disposed of in accordance with applicable regulations and testing requirements.

A wide variety of different polymer formulations may be utilized, dependent upon the wastewater composition. A preferred polymer employed in treating wastewater from automotive parts washers and the like employing an alkaline based cleaning solution consist of high molecular weight cationic polymers, organic acids and bases, and activated montmorillonite, which can be classified as a flocculent/encapsulant. This type of polymer is preferred for use in treatment of oily wastewater and is particularly useful in the clarification of oil and latex emulsions, such as those resulting from spray painting booths. One example preferred polymer powder possesses the following composition on a percent by weight basis:

| | |
|---|---|
| Calcium Oxide | 2–4% |
| Activated Carbon | 1–3% |
| Adipic Acid | 3–5% |
| bentonite clay | 88–94% |

When the polymer is dispersed in wastewater containing oil, latex and/or suspended solids, it simultaneously breaks the emulsion, scavenges and flocculates the contaminant. The flocs settle rapidly forming a sludge that can be dewatered to 20% to 40% solids. The polymer powder formulation promotes an encapsulating process which renders the sludge nonleachable for the purposes of EPA Toxicity. The sludge can therefore be typically disposed of in an ordinary refuse landfill.

The polymer powder takes a water system through each of the treatment steps that a traditionally oriented system would use. The process occurs quickly and sequentially without the need for extra holding tanks or constant supervision. This feat is accomplished by employing the differing solubility rates of each of the ingredients so that they become active at just the right time to accomplish the task at hand. The acidic portion of the polymer formulation goes into solution first. The result is a reduction of the pH of the wastewater which breaks any oily emulsions. Cationic (positively charged) polymers then attract the oil and some of the sparingly soluble negatively charged species such as phosphate or sulfate. The montmorillonite clay particles also participate as an absorbent for the oil.

The bases go into solution next taking the pH of the wastewater high enough to trigger the removal of any metals from solution as insoluble hydroxide precipitates. These hydroxides combine with the polymers and clay to form a thick, easily separated mass. There are additional benefits afforded by the clay, however. Many materials used to absorb wastewater contaminants do their job by purely mechanical means and do not actually bond the offending material very strongly.

Bentonite clay is extremely effective at removing certain cationic components from wastewaters. Bentonite has a remarkable affinity for metals, particularly heavy metals in solution. These metals become bound up in the clay through the process of ion exchange which is driven by electrostatic attractive forces between the metal cations in solution and the anionic surfaces of the clay particles.

Ion exchange is a process whereby charged ions are exchanged for one another on a solid support. It is the principle involved in the softening of water in commercial and home drinking water treatment. In the polymer powder example under discussion, the clay is an anionic (negatively charged) solid. This negative character is a consequence of unbalanced oxide ions in the clay lattice. In any system, negative charges must be balanced by positively charged ions paired with them. In this system, especially at the high pH involved, most of the anionic oxide sites are paired with sodium or calcium ions. These ions are very soluble in water and are constantly changing positions within the clay structure. Heavy metals, on the other hand, are much less soluble in water under alkaline conditions; furthermore, they form a much more strongly bonded association with the bentonite than either the sodium or calcium ions. This happens because whenever a heavy metal ion encounters a loosely bonded sodium ion residing on a clay surface, it replaces it. The resulting heavy metal cation/clay association is stronger because the charge to radius ratio of the heavy metal cations is greater and thereby favors the development of more highly localized charge density on these cations. Such cations possess fewer molecules of water in their hydration spheres and consequently are more strongly attracted to the negatively charged clay surface (i.e., via powerful electrostatic attractive forces). Under these conditions, the heavy metal cations are essentially completely immobilized.

Normally, such binding action would be quite adequate to accomplish the removal of this portion of the waste. However, these days, the toxic leachability of the resultant waste is also extremely important. The instant polymer powder process and system offers a further advantage in this regard because it forms easily dewatered sludges which pass the TCLP leach test. The non-leachable characteristic of the final floc is a consequence of two additional properties possessed by the inventive polymer powder system: 1) Under the right conditions, clay particles are attracted to each other, and 2) the resultant clay/floc mass can form a pozzolanic material. These two properties allow the for the isolation of the contaminants by a process that we refer to as microencapsulation.

The fact that clay particles can be attracted to each other is a very interesting phenomenon in colloidal science. Basic physics tells us that like-charged bodies repel each other and that oppositely charges bodies are attracted to each other.

When treating waste water with the inventive polymer powder system, other chemicals are also added and the solution becomes quite saturated with cations. Under these conditions, the extra cations are less fully hydrated and are forced into a tighter association with the clay surface whereupon the clay particle begins to act as if it has no charge (i.e., the cations are so close to the clay surface, the particle acts as if it were neutral). When they get close enough together, they stick to one another. This gathering together of the individual particles is the beginning of the process of flocculation. To some degree, all of the species in solution are affected by the electrostatic forces, not just the clay particles. Inevitably, the positively charged polymer molecules and their absorbed contaminants also get bound up on this floc and precipitate out of solution as the clay floc grows.

The pozzolanic nature of the clay is an additional active property relevant to the treatment process. For several of the formulations, it is the key property in the polymer powder approach to removing waste contaminants from solution.

Pozzolanic reactions are based upon the reaction between lime and pozzolanic materials to form permanent, covalent bonds that define a solid structure. In an idealized fashion, these reactions fall into three categories:

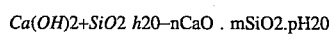

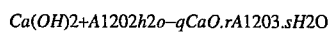

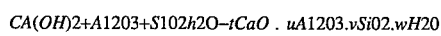

These chemical equations define the formation of calcium silicates, aluminates and aluminosilicates from the reaction between lime and the silicon and aluminum oxides that are the basic constituents of the pozzolans. In the polymer powder formulations that involve them, the inorganic bases in solution are believed to react with the bentonite clay according to the equations described above, as it flocculates. In this way, they form very intractable solid particles that fall out of solution. Once formed, these particles are amazingly resistant to leaching under TCLP conditions.

Summarizing, we can describe the operation of the inventive polymer powder process in the following way. First, the acidic component of the polymer powder causes oily contaminants to coalesce and separate from the water. Next the polymeric cationic portion of the formulation attracts any remaining oil and larger, more highly charged anions (such as phosphate and sulfate). Finally, the basic component comes into play helping precipitate metallic hydroxides and driving the system to a fully flocculated condition where the cationic polymer molecules (with any adsorbed oil), and metallic ions and positively charged materials are still remaining in the solution ion-exchange with the sodium on the clay and become strongly bound to the clay structure. The resulting mass is a complex mixture of encapsulated contaminants and waste solids held together. The clay particles then begin to stick together, entrapping the other components and surrounding them completely. Once the pozzolanic reactions begin between the lime and the bentonite to form a cementitious particle that drops to the bottom of the vessel, the process of microencapsulation is complete. The water becomes clear and the entire process is over in just minutes.

The contaminants, once microencapsulated, are surrounded by a barrier of clay particles and are unavailable to external leaching fluids for as long as these fluids are kept from the interior of the clay "pocket". Since the contaminants are evenly distributed throughout the particle, no great concentration is ever "open to the environment", even on a prolonged exposure to leaching in a landfill situation.

It is to be understood, however, that even though numerous characteristics and advantages of the present invention have been set forth in the foregoing description, together with details of the structure and function of the invention, the disclosure is illustrative only, and changes may be made in detail, especially in matters of materials, shape, size and arrangement of parts within the principles of the invention to the full extent indicated by the broad general meaning of the terms in which the appended claims are expressed.

I claim:

1. An apparatus for batch recycling of contaminated wastewater from industrial equipment through the addition of a flocculating polymer, said apparatus comprising:

a treatment tank;

a recovery vessel operably associated with said treatment tank for receiving purified wastewater from said treatment tank;

a pump and operably associated piping for pumping contaminated wastewater from industrial equipment to said treatment tank and for pumping purified wastewater from said recovery vessel to said industrial equipment;

dispensing means for introducing a flocculating polymer into said treatment tank;

agitating means for agitating wastewater in said treatment tank; and said pump, said agitating means, and said dispensing means each powered solely by a compressed air supply.

2. The apparatus of claim 1, further comprising skimming means for skimming separated oil from a surface of wastewater in said treatment tank.

3. The apparatus of claim 2, wherein said skimming means comprises a substantially vertically extending tube having an open upper end terminating in an upper level of said treatment tank and an outlet end in fluid communication with an oil drain valve.

4. The apparatus of claim 3, further comprising a substantially frustoconical weir on said open upper end of said tube.

5. The apparatus of claim 1, wherein said dispensing means comprises:

a compressed air supply source;

a polymer hopper possessing a polymer outlet;

a polymer supply conduit possessing an outlet connected to said treatment tank; and an induction nozzle in fluid communication with said polymer outlet and said polymer supply conduit and selectively connectable to said air supply source such that polymer from said hopper may be selectively entrained in a compressed air stream and blown into said treatment tank.

6. The apparatus of claim 1, wherein said agitating means comprises:

a compressed air supply;

a rotary air motor selectively connectable to said air supply; and a shaft including at least one mixing vane in said treatment tank operably connected for rotation by said air motor.

7. The apparatus of claim 6, further comprising means for directing exhaust air from said rotary air motor into said treatment tank for facilitating agitation of wastewater within said treatment tank.

8. The apparatus of claim 1, wherein said agitation means includes at least one baffle extending inwardly from an interior wall of said treatment tank.

9. The apparatus of claim 1, further comprising a converging bottom portion of said treatment tank possessing a sludge outlet.

10. The apparatus of claim 9, further comprising a purified fluid decant outlet possessing an inlet in said treatment tank disposed at a level above said sludge outlet.

11. The apparatus of claim 10, wherein said recovery vessel is disposed in fluid communication with said decant outlet.

12. The apparatus of claim 11, further comprising means for filtering fluid passing from said decant outlet into said recovery vessel.

13. The apparatus of claim 1, further comprising a sight glass in fluid communication with said treatment tank for allowing observation of fluid level and process status.

14. An apparatus for batch recycling of contaminated wastewater from industrial equipment through the addition of a flocculating polymer, said apparatus comprising:

a treatment tank;

a compressed air supply source;

a polymer hopper possessing a polymer outlet;

a polymer supply conduit possessing an outlet connected to said treatment tank; and an induction nozzle in fluid communication with said polymer outlet and said polymer supply conduit and selectively connectable to said air supply source such that polymer from said hopper may be selectively entrained in a compressed air stream and blown into said treatment tank.

15. The apparatus of claim 1, further comprising:

a wastewater conduit connected to said industrial equipment;

a wastewater inlet/outlet in said treatment tank;

a purified wastewater drain in said recovery vessel;

a first two-way valve for selectively connecting either said recovery vessel drain or said wastewater conduit to an intake of said pump; and a second two-way valve for selectively connecting an outlet of said pump to either said treatment tank inlet/outlet or said wastewater conduit.

16. An apparatus for batch recycling of contaminated wastewater from industrial equipment through the addition of a flocculating polymer, said apparatus, comprising:

a treatment tank;

a recovery vessel operably associated with said treatment tank for receiving purified wastewater from said treatment tank;

a pump and operably associated piping for pumping contaminated wastewater from industrial equipment to said treatment tank and for pumping purified wastewater from said recovery vessel to said industrial equipment;

dispensing means for introducing a flocculating polymer into said treatment tank;

a compressed air supply;

a rotary air motor selectively connectable to said air supply; and a shaft including at least one mixing vane in said treatment tank operably connected for rotation by said air motor for agitating wastewater in said treatment tank.

17. The apparatus of claim 16, further comprising skimming means for skimming separated oil from a surface of wastewater in said treatment tank.

18. The apparatus of claim 17, wherein said skimming means comprises a substantially vertically extending tube having an open upper end terminating in an upper level of said treatment tank and an outlet end in fluid communication with an oil drain valve.

19. The apparatus of claim 18, further comprising a substantially frustoconical weir on said open upper end of said tube.

20. The apparatus of claim 16, wherein said dispensing means comprises:

a polymer hopper possessing a polymer outlet;

a polymer supply conduit possessing an outlet connected to said treatment tank; and an induction nozzle in fluid communication with said polymer outlet and said polymer supply conduit and selectively connectable to said air supply source such that polymer from said hopper may be selectively entrained in a compressed air stream and blown into said treatment tank.

21. The apparatus of claim 16, further comprising means for directing exhaust air from said rotary air motor into said treatment tank for facilitating agitation of wastewater within said treatment tank.

22. The apparatus of claim 16, further comprising at least one baffle extending inwardly from an interior wall of said treatment tank.

23. The apparatus of claim 16, further comprising a converging bottom portion of said treatment tank possessing a sludge outlet.

24. The apparatus of claim 23, further comprising a purified fluid decant outlet possessing an inlet in said treatment tank disposed at a level above said sludge outlet.

25. The apparatus of claim 24, wherein said recovery vessel is disposed in fluid communication with said decant outlet.

26. The apparatus of claim 25 further comprising means for filtering fluid passing from said decant outlet into said recovery vessel.

27. The apparatus of claim 16, further comprising a sight glass in fluid communication with said treatment tank for allowing observation of fluid level and process status.

28. The apparatus of claim 16, wherein said pump and said dispensing means are each powered solely by said compressed air supply.

29. The apparatus of claim 16, further comprising:

a wastewater conduit connected to said industrial equipment;

a wastewater inlet/outlet in said treatment tank;

a purified wastewater drain in said recovery vessel;

a first two-way valve for selectively connecting either said recovery vessel drain or said wastewater conduit to an intake of said pump; and a second two-way valve for selectively connecting an outlet of said pump to either said treatment tank inlet/outlet or said wastewater conduit.

30. An apparatus for batch recycling of contaminated wastewater from industrial equipment through the addition of a flocculating polymer, said apparatus, comprising:

a treatment tank;

a recovery vessel operably associated with said treatment tank for receiving purified wastewater from said treatment tank;

a pump and operably associated piping for pumping contaminated wastewater from industrial equipment to said treatment tank and for pumping purified wastewater from said recovery vessel to said industrial equipment;

a dispenser for introducing a flocculating polymer into said treatment tank;

an agitator for agitating wastewater in said treatment tank; and said pump, said agitator, and said dispenser each powered solely by a compressed air supply.

31. An apparatus for batch recycling of contaminated wastewater from industrial equipment through the addition of a flocculating polymer, said apparatus, comprising:

a treatment tank;

a recovery vessel operably associated with said treatment tank for receiving purified wastewater from said treatment tank;

a pump and operably associated piping for pumping contaminated wastewater from industrial equipment to said treatment tank and for pumping purified wastewater from said recovery vessel to said industrial equipment;

a dispenser for introducing a flocculating polymer into said treatment tank;

a compressed air supply;

a rotary air motor selectively connectable to said air supply; and a shaft including at least one mixing vane in said treatment tank operably connected for rotation by said air motor for agitating wastewater in said treatment tank.

32. An apparatus for batch recycling of contaminated wastewater from industrial equipment through the addition of a flocculating polymer, said apparatus, comprising:

a treatment tank;

a recovery vessel operably associated with said treatment tank for receiving purified wastewater from said treatment tank;

a pump and operably associated piping for pumping contaminated wastewater from industrial equipment to said treatment tank and for pumping purified wastewater from said recovery vessel to said industrial equipment;

a compressed air supply source;

an air-driven agitator connected to said air supply source for agitating wastewater in said treatment tank;

a polymer hopper possessing a polymer outlet;

a polymer supply conduit possessing an outlet connected to said treatment tank; and an induction nozzle in fluid communication with said polymer outlet and said polymer supply conduit and selectively connectable to said air supply source such that polymer from said hopper may be selectively entrained in a compressed air stream and blown into said treatment tank.

33. An apparatus for batch recycling of contaminated wastewater from industrial equipment through the addition of a flocculating polymer, said apparatus comprising:

tank means for containing a quantity of contaminated wastewater during treatment;

recovery means operably associated with said tank means for receiving purified wastewater from said tank means after treatment;

pump means for pumping contaminated wastewater from industrial equipment to said tank means and for pumping purified wastewater from said recovery means to said industrial equipment;

means for introducing a flocculating polymer into said treatment tank; and means for agitating wastewater in said treatment tank.

34. The apparatus of claim 33, further comprising skimming means for skimming separated oil from a surface of wastewater in said tank means.

35. The apparatus of claim 34, wherein said skimming means comprises a substantially vertically extending tube having an open upper end terminating in an upper level of said tank means and an outlet end in fluid communication with an oil drain valve.

36. The apparatus of claim 35, further comprising a substantially frustoconical weir on said open upper end of said tube.

37. The apparatus of claim 33, wherein means for introducing a flocculating polymer comprises:

a compressed air supply source;

a polymer hopper possessing a polymer outlet;

a polymer supply conduit possessing an outlet connected to said tank means; and an induction nozzle in fluid communication with said polymer outlet and said polymer supply conduit and selectively connectable to said air supply source such that polymer from said hopper may be selectively entrained in a compressed air stream and blown into said tank means.

38. The apparatus of claim 33, wherein said means for agitating comprises:

a compressed air supply;

a rotary air motor selectively connectable to said air supply; and a shaft including at least one mixing vane in said tank means operably connected for rotation by said air motor for agitating wastewater in said tank means.

39. The apparatus of claim 38, further comprising means for directing exhaust air from said rotary air motor into said tank means for facilitating agitation of wastewater within said tank means.

40. The apparatus of claim 33, further comprising at least one baffle extending inwardly from an interior wall of said tank means.

41. The apparatus of claim 33, further comprising a converging bottom portion of said tank means possessing a sludge outlet.

42. The apparatus of claim 41, further comprising a purified fluid decant outlet possessing an inlet in said tank means disposed at a level above said sludge outlet.

43. The apparatus of claim 42 wherein said recovery means is disposed in fluid communication with said decant outlet.

44. The apparatus of claim 43, further comprising means for filtering fluid passing from said decant outlet into said recovery means.

45. The apparatus of claim 33, further comprising a sight glass in fluid communication with said tank means for allowing observation of fluid level and process status.

46. The apparatus of claim 33, wherein said means for pumping and said means for introducing are each powered solely by a compressed air supply.

47. The apparatus of claim 33, further comprising:

a wastewater conduit connected to said industrial equipment;

a wastewater inlet/outlet in said tank means;

a purified wastewater drain in said recovery means;

a first two-way valve for selectively connecting either said purified wastewater drain or said wastewater conduit to an intake of said means for pumping; and a second two-way valve for selectively connecting an outlet of said means for pumping to either said tank means inlet/outlet or said wastewater conduit.

* * * * *